Figure 1:
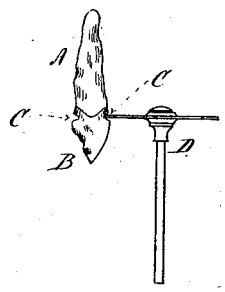

(No Model.)

C. M. RICHMOND.
PREPARING ROOTS OF TEETH FOR RECEPTION OF ARTIFICIAL DENTURES.

No. 277,943. Patented May 22, 1883.

ATTEST:
J. A. Murdle
William Paxton

INVENTOR:
C. M. Richmond
By Charles E. Foster
Atty.

N. PETERS, Photo-Lithographer, Washington, D. C.

UNITED STATES PATENT OFFICE.

CASSIUS M. RICHMOND, OF NEW YORK, N. Y., ASSIGNOR TO THE RICHMOND TOOTH CROWN COMPANY, OF SAME PLACE.

PREPARING ROOTS OF TEETH FOR RECEPTION OF ARTIFICIAL DENTURES.

SPECIFICATION forming part of Letters Patent No. 277,943, dated May 22, 1883.

Application filed January 8, 1883. (No model.)

*To all whom it may concern:*

Be it known that I, CASSIUS M. RICHMOND, of the city, county, and State of New York, have invented a new and useful Improvement in Preparing Roots of Teeth for the Reception of Artificial Dentures, of which the following is a full, true, and exact description, reference being had to the accompanying drawings.

In the application of artificial dentures it is often necessary that the part of the tooth which projects beyond the gum, or that portion which is known as the "crown," should be removed in such a way that the root may serve as a support for the artificial denture. According to the method for which I have made several applications for Letters Patent, the said artificial denture is supported upon a cap surrounding the root and inclosing it below and to a certain extent beneath the gum. My present improvement has especially reference to a method of preparing the roots for the application of such cap; but it is equally applicable to the preparation of roots for any other suitable support for artificial dentures.

The present method is particularly applicable to single-root teeth, and it enables the operator not only to externally prepare the root for the reception of the holding device, but to also so treat the root as to entirely prevent or greatly lessen any danger of subsequent irritation, which might otherwise produce abscesses or similar disorders.

I have discovered that by the method which I shall hereinafter describe, the tooth-crown can be removed in many cases painlessly, and in those cases in which some pain might be felt I propose to use a method of freezing the teeth, which will form the subject of a separate application for Letters Patent.

In carrying out my method practically I first cut horizontal grooves through the enamel of a tooth, opposite each other, one on the face of the tooth next to the gum and the other on the palatine wall of the tooth. These grooves are preferably cut by means of a rapidly-revolving corundum dental disk or wheel; but I do not limit myself to this method. These grooves prevent the splitting of the crown in the subsequent operation, and likewise afford a guide for the cutting-tool. I thereafter apply the cutting-edges of a pair of excising-forceps to the grooves already cut and quickly sever the crown from the root, leaving the nerve bare. In some instances the nerve follows the crown on its removal. This operation seems to paralyze the pulp or nerve, driving the blood therefrom and benumbing it. I then provide a suitably-shaped piece of wood, which should be cut to correspond generally to the shape of the nerve-cavity or pulp-canal. This wood should be of a soft and easily-compressible nature. I find the so-called "orange-wood" well adapted to this purpose. The wood so shaped I drive at a single blow to the apex of the root, severing the pulp at its foraminal construction, and in many instances forcing it out of its cavity toward the mouth by displacing it. I then remove the wood and carefully cleanse the pulp-canal with cotton saturated with carbolic acid or other antiseptic, removing, if necessary, any particles remaining of the pulp by means of a dental broach.

In order to avoid pain by treating the tooth while still benumbed and to prevent abscess or inflammation, it is very important to close the pulp-canal immediately. This I accomplish by driving a second piece of wood, shaped like the first, into the pulp-canal in the presence of carbolic acid, filling it to its apical foramen, thus perfectly excluding the air.

When the pulp-canal is so small that I cannot force a sharpened piece of wood into it, or when the pulp has become partially calcified and is still sensitive, or when there is a deposit of sensitive secondary dentine, precluding the excavation for the insertion of a pivot and a proper plugging of the end of the root, I then adopt a freezing process, using a suitable spray apparatus, and freezing the tooth and pulp immediately after cutting the grooves for breaking off the tooth. I can then drill out what remains of the partially-calcified nerve or pulp without causing pain, and I then proceed to plug the teeth according to the method hereinbefore described.

In practice, for the reception of my artificial denture to which I have previously referred, I generally drill out the lower portion of the tooth, making a cylindrical cavity larger than the nerve-canal.

My invention will be readily understood by the accompanying drawings, in which similar letters refer to similar parts.

Figure 2:
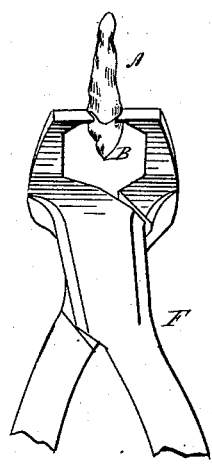
Figure 3:
Figure 4:
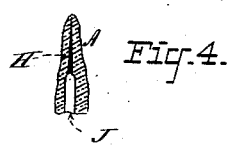

Figure 1 represents an elevation of the crown and root, showing the corundum disk in process of grooving the same. Fig. 2 shows the forceps in position before the crown is removed. Fig. 3 shows the operation of driving out the pulp, and Fig. 4 shows the prepared root.

Similar letters refer to similar parts in all the figures.

A represents the root, and B the crown before removal.

C represents the grooves, and D the corundum disk.

E represents the suitably-prepared piece of wood for driving out the nerve, and G represents the nerve or pulp driven out.

H represents the subsequent wood filler, filling the upper part of the nerve-cavity; and J represents the lower portion of the root suitably drilled for the pin or other attaching contrivance.

In Fig. 1 is shown the operation of grooving the tooth between the root and crown. One groove has already been cut and the disk is shown cutting the other.

In Fig. 2, the grooves having been cut, the forceps is shown as applied. By these forceps the crown is removed, and a suitably-shaped piece of wood having been prepared, it is shown in Fig. 3 as driven up to the apical foramen of the root. This operation expels the nerve-pulp. Thereafter the permanent wood filler is driven into the nerve-cavity, as shown in Fig. 4, and, if desired, the lower part of the pulp-cavity is enlarged for the purpose of receiving some attaching contrivance. Whether or not the tooth is to be frozen depends upon its character, and in general I do not recommend this process. There are, however, certain peculiar cases where it is necessary.

What I claim as my invention, and desire to secure by Letters Patent, is—

1. The process of preparing roots for the reception of artificial dentures, which consists in grooving the same by opposite grooves, and then suddenly removing the crown from the root by a suitable forceps, substantially as described.

2. The process of preparing a root for the reception of an artificial denture, which consists in removing the crown from the root by a suitable contrivance, and then immediately expelling the nerve from its cavity by driving a suitably-shaped piece of wood into the nerve-cavity, substantially as described.

3. The process of treating and preparing the roots of teeth, the same consisting in suddenly expelling the nerve from its cavity, as set forth, and then instantly filling the nerve-cavity with a wooden plug, substantially as set forth.

4. The process of preparing a root for the reception of an artificial denture, which consists in removing the crown, and then driving into the nerve-cavity a suitably-shaped piece of wood, in removing the same and cleansing the nerve-cavity, and in immediately plugging or filling the upper part of the nerve-cavity by driving in another piece of wood, substantially as described.

CASSIUS M. RICHMOND.

Witnesses:
OTTO BAUMANN,
WILLIAM PAXTON.